Sept. 23, 1958   L. C. THOMAS   2,853,220
SAFETY BELT GRIPPING SLEEVE
Filed June 27, 1956
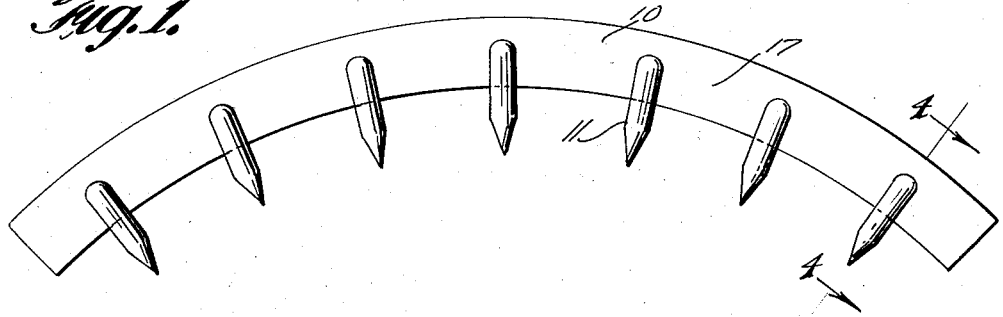
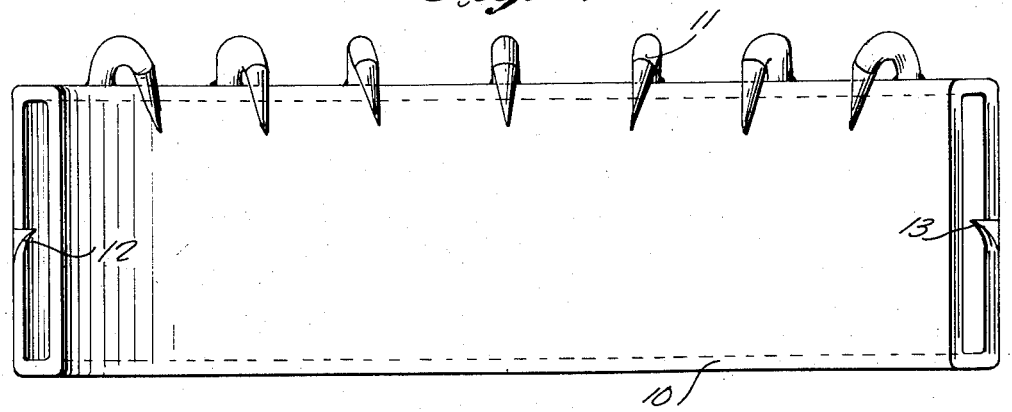
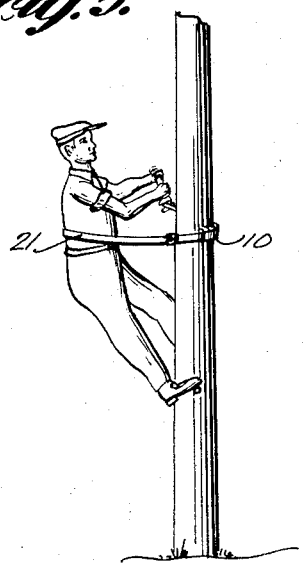
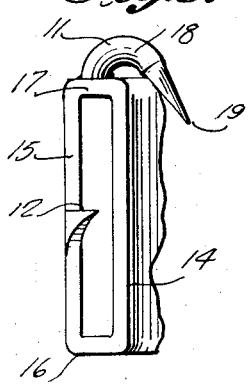
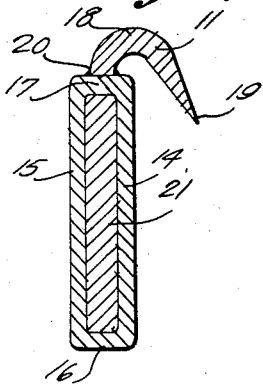
INVENTOR.
Leonard C. Thomas
BY *Victor J. Evans & Co.*
ATTORNEYS United States Patent Office 2,853,220
Patented Sept. 23, 1958

2,853,220

SAFETY BELT GRIPPING SLEEVE

Leonard C. Thomas, Annandale, Va.

Application June 27, 1956, Serial No. 594,234

1 Claim. (Cl. 227—24)

This invention relates to safety belts particularly as used by linemen on telegraph and telephone poles, and in particular a sleeve, rectangular-shaped in cross section, through which a safety belt extends whereby with the sleeve positioned on the portion of the belt bearing against a pole sharp gripping prongs extended inwardly from the upper edge of the sleeve penetrate into the surface of a telephone pole positively preventing slippage of a belt downwardly on a pole.

The purpose of this invention is to eliminate the hazard resulting from safety belts slipping downwardly on poles while a lineman is occupied repairing wires or insulators or installing lines on poles.

In working on poles linemen use spurs clamped to the lower legs and positioned on the inner surfaces or at the instep portions of shoes and with the spurs forced into the surface of the pole a belt is positioned around the pole above the point where the spurs are located whereby a lineman may work with safety and without the possibility of slipping downwardly on a pole. The belts are retained in position on the pole by tension and while working on wires, insulators, and the like on cross arm of poles a lineman often moves inwardly toward the pole with the result that slack is placed in the belt and the belt drops downwardly to a dangerous position without warning. With this thought in mind this invention contemplates a device that places gripping teeth on the portion of the belt positioned against the pole whereby with the teeth forced into the pole the device through which the belt extends, is positively retained in position and the possibility of downward movement thereof is obviated.

The object of this invention is, therefore, to provide a pole gripping device that is adapted to be used on a safety belt.

Another object of the invention is to provide a pole gripping attachment for safety belts in which the attachment is adapted to be used on belts now in use without making modifications in the belts.

A further object of the invention is to provide a gripping device for retaining safety belts in upwardly disposed positions in which the device is of a simple and economical construction.

With these and other objects and advantages in view the invention embodies an arcuate elongated sleeve, rectangular-shaped in cross section having spaced inwardly and downwardly disposed prongs extended from the upper edge and having projections adapted to extend into openings of a belt extended inwardly on the ends.

Other features and advantages of the invention will appear from the following description taken in connection with the drawing, wherein:

Figure 1 is a plan view of the improved safety belt gripping sleeve.

Figure 2 is an elevatioal view of the sleeve looking toward the inner surface thereof.

Figure 3 is an end elevational view of the sleeve with parts broken away.

Figure 4 is a cross section through the sleeve taken on line 4—4 of Fig. 1.

Figure 5 is a view illustrating the use of the sleeve showing the device positioned on a safety belt of a lineman, the lineman being supported by spurs or spikes driven into the surface of a pole.

Referring now to the drawing wherein like reference characters denote corresponding parts the improved safety belt gripping sleeve of this invention includes a tubular member or sleeve 10 having spaced prongs 11 extended from the upper surface and having projections 12 and 13 positioned on the ends.

The tube or sleeve 10 is provided with an inner wall 14, an outer wall 15 from which the projections 12 and 13 extend, a base 16 and an upper section 17.

The sleeve 10 may be formed of sheet metal, plastic, or other suitable material and the prongs 11, which are substantially U-shaped, extend upwardly to points 18 and downwardly and inwardly with the ends tapering to provide sharp points 19 that are positioned to penetrate the surface of a pole. The base portions of the prongs are secured to the upper section 17 of the sleeve by welding, as indicated by the numeral 20.

It will be understood that any suitable number of prongs may be used and the formation of the prongs may be varied to correspond with different types of poles upon which safety belts are used.

The projections 12 and 13 which extend inwardly from the outer wall 15 are positioned to extend into spaced openings of a belt, such as the opening for receiving the tongue or prong of a belt buckle.

In use the sleeve is placed over a belt 21 and moved along the belt until it is on the opposite side of the pole from the side upon which the lineman is positioned, whereby the weight of the body exerts a strain that forces the points 19 of the prongs 11 into the pole.

With the device in position a lineman may work with safety and with the assurance that the belt will not slide downwardly on the pole.

It will be understood that modifications, within the scope of the appended claim, may be made in the design and arrangement of the parts without departing from the spirit of the invention.

What is claimed is:

In a safety belt gripping sleeve, the combination which comprises a tubular arcuate body, rectangular-shaped in cross section having inner and outer walls connected at the lower edges with a base and at the upper edges with an upper section, substantially U-shaped prongs positioned with one of the legs thereof secured, such as by welding, to the upper surface of the upper section of the sleeve and with the opposite leg extended inwardly and downwardly and tapering to a point, and projections extended inwardly from the intermediate part of the outer wall of the body and positioned to register with spaced openings of the belt extended through the sleeve.

References Cited in the file of this patent

UNITED STATES PATENTS

| 477,079 | Stoddard | June 14, 1892 |
| 572,751 | Hanna | Dec. 8, 1896 |
| 869,382 | Newton | Oct. 29, 1907 |
| 1,277,135 | Schemel | Aug. 27, 1918 |
| 2,392,538 | Knudsen | Jan. 8, 1946 |

FOREIGN PATENTS

| 28,060 | Australia | July 28, 1930 |